United States Patent [19]

Kanao

[11] Patent Number: 4,962,691
[45] Date of Patent: Oct. 16, 1990

[54] MOUNTING STRUCTURE OF A MULTIPLE PISTON RING

[76] Inventor: Mitsuhiro Kanao, 3-2, Chuou 1-Chome, Yakeyama, Kure-Shi, Hiroshima-Ken, Japan

[21] Appl. No.: 506,599
[22] Filed: Apr. 6, 1990

Related U.S. Application Data

[63] Continuation of Ser. No. 249,329, Sep. 26, 1988, abandoned.

[30] Foreign Application Priority Data

May 25, 1988 [JP] Japan ................... 63-128727

[51] Int. Cl.⁵ .............................. F16J 1/04
[52] U.S. Cl. ...................... 92/208; 123/198 P; 277/137; 277/150; 277/136; 92/261
[58] Field of Search ............. 92/136, 137, 193, 199, 92/220, 221, 208, 216, 255; 277/137, 150, 136

[56] References Cited

U.S. PATENT DOCUMENTS

| | | | |
|---|---|---|---|
| 1,277,291 | 8/1918 | Canfield | 277/136 |
| 1,392,308 | 10/1921 | Doyle et al. | 277/137 |
| 1,510,778 | 10/1924 | Hart | 277/136 |
| 1,605,810 | 11/1926 | Cormier | 277/136 |
| 1,660,846 | 2/1928 | McMinn et al. | 277/136 |
| 1,671,526 | 5/1928 | Gilmer | 277/137 |
| 1,777,501 | 10/1930 | Niethamer | 277/137 |
| 1,835,139 | 12/1931 | Bullard | 277/137 |
| 2,248,779 | 7/1941 | Phillips | 277/137 |
| 2,300,518 | 11/1942 | Phillips | 277/136 |
| 2,465,415 | 3/1949 | Aragones | 277/136 |
| 2,481,553 | 9/1949 | Williams | 277/136 |
| 2,606,085 | 8/1952 | Kiekhaefer | 277/137 |
| 3,184,245 | 5/1965 | Woolcott | 277/136 |
| 3,346,252 | 10/1967 | Saylor | 277/137 |
| 3,391,943 | 7/1968 | Riley | 277/137 |
| 4,367,702 | 1/1983 | Lassanske | 277/136 |

FOREIGN PATENT DOCUMENTS

| | | | |
|---|---|---|---|
| 584404 | 9/1933 | Fed. Rep. of Germany | 277/136 |
| 855790 | 5/1940 | France | 277/150 |
| 1030378 | 6/1953 | France | 277/150 |
| 339732 | 5/1935 | Italy | 277/150 |
| 333662 | 10/1958 | Switzerland | 277/136 |
| 9969 | of 1912 | United Kingdom | 277/137 |
| 656463 | 8/1951 | United Kingdom | 277/136 |
| 750949 | 6/1956 | United Kingdom | 277/136 |

Primary Examiner—Edward K. Look
Assistant Examiner—Thomas Denion
Attorney, Agent, or Firm—Kramer, Brufsky & Cifelli

[57] ABSTRACT

This invention relates to a mounting structure of a multiple piston ring for various internal combustion engines. A plurality of piston rings are all wrapped in a cylindrical groove formed upon an outer surface of a piston so that a gap of one piston ring cannot face to a gap of the other piston ring, namely respective gaps of the plurality of piston rings are spaced each other with a certain distance. In order to prevent such a facing of two or more gaps that may occur due to a rotation of the piston rings, a stop pin is mounted on a piston wall so as to engage with a gap of one piston ring or formed as a convex protrusion on one piston ring so as to engage with a gap of the other piston ring. Since respective gaps of the piston rings are not faced to each other, it is possible to prevent any back pressure gas leakage from such gaps of the piston rings.

2 Claims, 5 Drawing Sheets

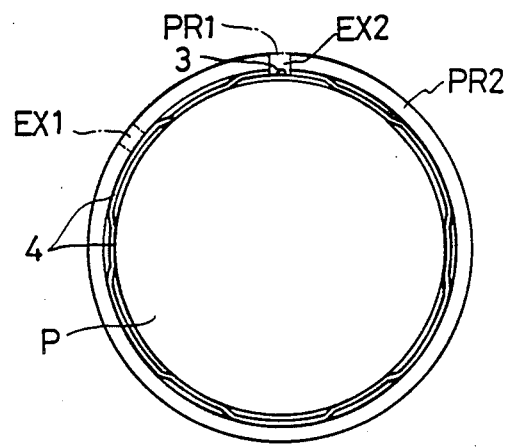
F I G. 12
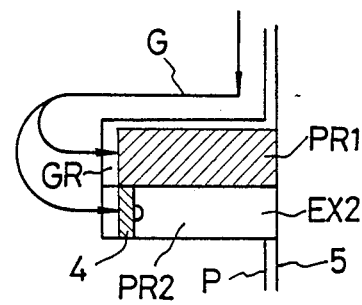
F I G. 13
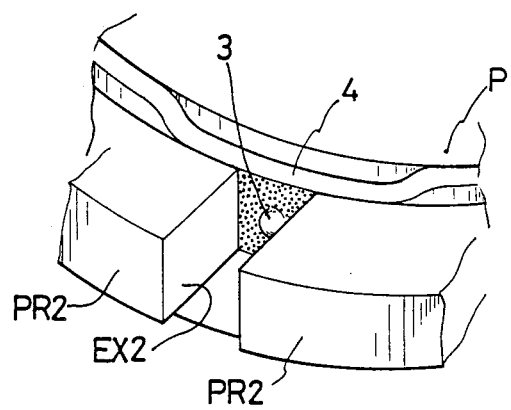
F I G. 14

MOUNTING STRUCTURE OF A MULTIPLE PISTON RING

This application is a continuation of application Ser. No. 249,329, filed Sept. 26, 1988, now abandoned.

BACKGROUND OF THE INVENTION

1. Field of the Invention

This invention relates to a mounting structure of a multiple piston ring for various internal combustion engines such as particularly a two cycle engine.

2. Description of the Prior Art

A conventional dual piston ring was invented in the 1930's. Such a dual piston ring had been used for the purpose of e.g. discharging any oil dust irrespective of its airtight maintenance, but nowadays, is rarely used. Any piston ring for packing purpose is disposed in a cylindrical groove formed upon an outer surface of a piston.

The profile of a gap in such a piston ring is various: namely, (1) a right-angled type gap (e.g. shown in FIG. 1 or FIG. 7), (2) an inclined type gap, (3) a step type gap, (4) a two-step type gap, etc. The gas leakage in such piston ring is mostly caused through the gap. When adjacent piston rings have respective step on their opposing side wall, the gas leakage is very little, but its machining process is expensive, and danger of fracture of the piston ring is probable. Accordingly, this type is scarcely used.

The right-angled type gap and the inclined type gap can be formed by a simple machining work, and are very popular. Yet, the quantity of the gas leakage is much due to such a gap.

To cope with this defect, it has been considered to form the piston ring groove in a multi-stage manner, due to which a labyrinth effect is obtained. However, since the gap is not sealed completely, it is not a final resolution.

Referring to FIGS. 1 and 2, a gas G is leaked from a gap Ex between adjacent side walls of a piston ring PR, so that a preferred packing effect cannot be attained. It brings a decline of an engine output and a discharge of an exhaust gas.

The springiness of the piston ring is generally weak, namely about 1 to 2 kg/cm$^2$, while the combustion gas pressure of the gasoline engine is 35 kg/cm$^2$ and that of the diesel engine is 60 kg/cm$^2$.

Under such circumstances, the piston ring cannot resist such a high pressure gas. However, it maintains a weak fitting condition for a cylinder due to its weak springiness, thereby a unique packing effect is attained. More specifically when such a high pressure gas is applied to the piston ring, it is penetrated into a back side of the piston ring through a gap of about 0.05 mm, thereby the back side of it is pressurized and a high packing effect is attained.

The piston ring which is used today is provided with a gap of 0.5 to 1.00 mm in width. For this reason, the high pressure gas is freely passing through the gap, so that a sufficient packing effect is not obtained. Further, when the outer circumference of the piston ring is worn out, the gap of the piston ring is enlarged, so that the packing effect is reduced.

In view of the above, this invention has been accomplished.

BRIEF SUMMARY OF THE INVENTION

It is a general object of this invention to provide a mounting structure of a multiple piston ring having a suitable packing effect, in which respective gaps of a plurality of piston rings disposed in a groove of a piston are spaced with a certain distance.

More specifically, since a gap of a top ring cannot face to a gap of a second ring, only a gap of the top ring through which a gas passes is blocked, while a gap of the second ring is opened, so that a high pressure gas is penetrated into such opened gap, and a back side of the piston ring is pressurized by such a high pressure gas. Thus, a suitable packing effect is maintained.

It is another object of this invention to provide a mounting structure of a multiple piston ring, in which a stop pin is mounted on a piston wall or formed in a gap of a piston ring in order to prevent any rotation of the piston ring. Thus, the multiple piston ring can be easily inserted into a cylinder, and its manufacturing cost becomes lower.

It is a further object of this invention to provide a mounting structure of a multiple piston ring, in which a ring-shaped resilient member is mounted between a second ring and a groove for the multiple piston ring, thereby any gas leakage from the gap of the piston ring can be prevented entirely.

BRIEF DESCRIPTION OF THE ACCOMPANYING DRAWINGS

FIG. 1 and FIG. 2 respectively are partially cutaway perspective views of a conventional mounting structure of a piston ring, in which the flow of a back pressure gas is shown.

FIG. 12 is a plan view of a third embodiment according to this invention.

FIG. 13 is a partially cutaway section view of the third embodiment.

FIG. 14 is a partially cutaway perspective view of the third embodiment.

DETAILED DESCRIPTION OF PREFERRED EMBODIMENTS

Embodiment 1

A first embodiment of this invention will be described with reference to FIGS. 3 to 7 which are supported by appended claims 1 and 2.

Figure 1:
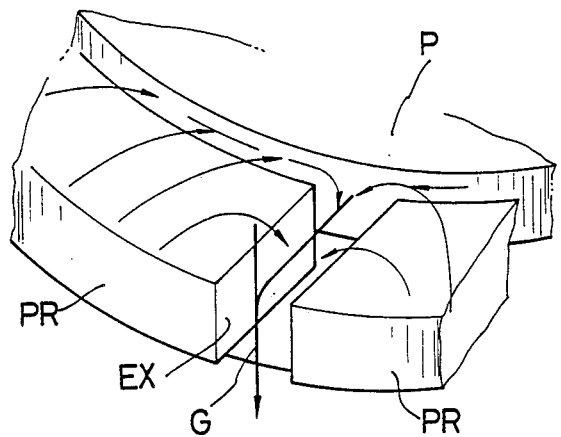
Figure 2:
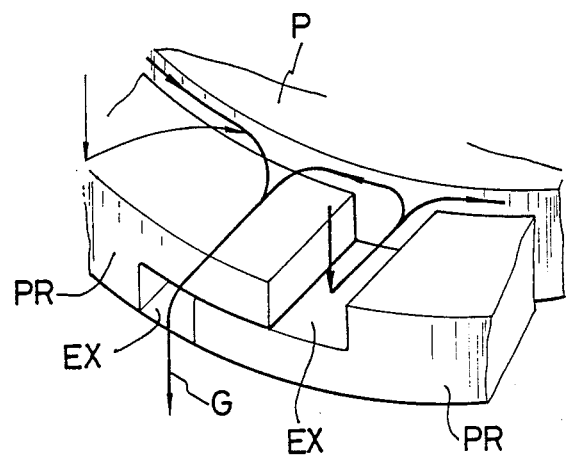
Figure 3:
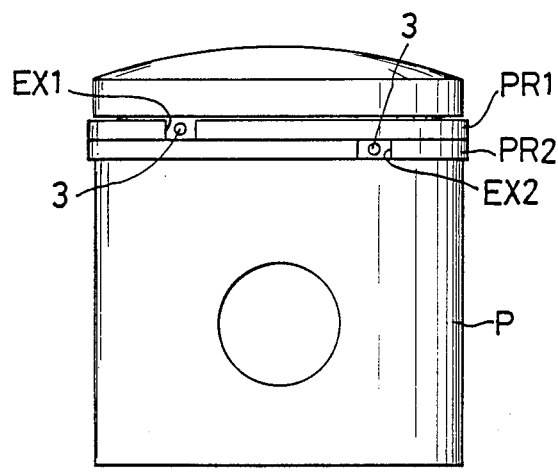
FIG. 3 is a side view of a first embodiment according to this invention.
Figure 4:
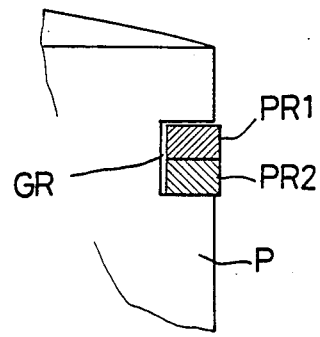
FIG. 4 is a partially cutaway section view of FIG. 3.

As shown in FIGS. 3 and 4, a piston P consists of a top piston ring PR$_1$ and a second piston ring PR$_2$, which are fitted to each other within a groove GR of the piston P, so that a first gap Ex1 of the top piston ring PR₁ cannot face directly to a second gap Ex2 of the second piston ring PR₂.

If the piston P consists of two piston rings, one gap is shifted at 180 degrees relative to the other gap. If the piston P consists of three piston rings, respective gaps are spaced with each other by every 120 degrees. If the piston P consists of four piston rings, respective gaps are spaced with each other by every 90 degrees. The respective piston rings must be closely fitted to each other.

Figure 5:
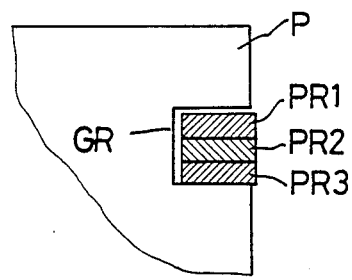
FIG. 5 is a partially cutaway section view of three piston rings placed one above another in a groove of a piston.

Numeral 3 is a stop pin which is disposed on a bottom of the groove GR of the piston P. The stop pin 3 is to be engaged with the gaps $Ex_1$ and $Ex_2$ of the piston rings $PR_1$ and $PR_2$ respectively. FIG. 5 shows a section view, in which three piston rings $PR_1$, $PR_2$ and $PR_3$ are placed one above another in the groove GR of the piston P.

Under such a construction, even if any piston ring is subject to a high temperature during a high-velocity operation of an internal combustion engine, such a triple piston ring can exhibit a high resistance to high temperature and pressure.

Since the profile of the gap in the present piston ring is a right-angled type, it can be manufactured at a low cost, and a complete packing effect can be obtained within one groove.

Further, it is not necessary to make the gap particularly narrower. For example, even though the gap is widened to about 5 mm, a sufficient air tightness can be maintained. Therefore, it is possible to dispose the stop pin within such a widened gap, so that any special space for the stop pin is entirely unnecessary. Thus, the manufacturing cost of the piston ring becomes inexpensive, and the insertion of the piston ring into the cylinder becomes easier.

Figure 6:
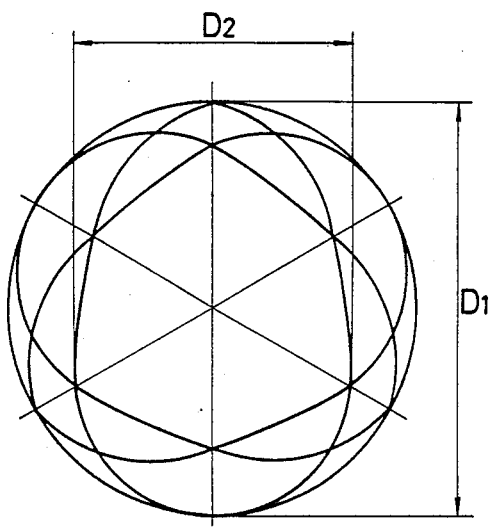
FIG. 6 shows pressure distribution curves of the three piston rings in FIG. 5.
Figure 7:
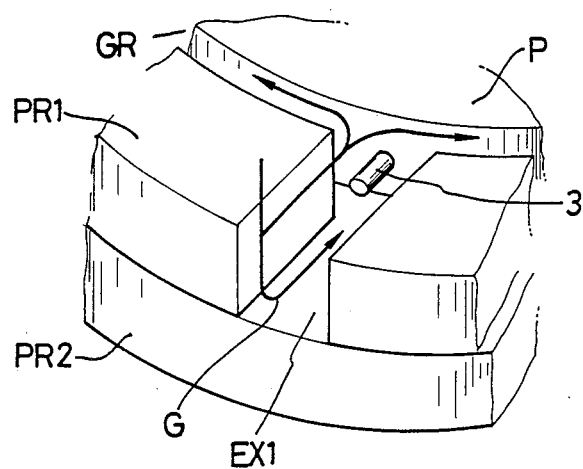
FIG. 7 is a partially cutaway view of the gas flow in FIG. 3.

FIG. 6 shows pressure distribution curves of three piston rings in FIG. 5, in which each curve has a pear-shaped oval profile of a length $D_1$ and a width $D_2$. The three piston rings having such a triple curve is very effective particularly for any piston machines requiring a low speed driving and a low compression.

The experimental results of the device according to this invention will now be described. The experiment was conducted by using an internal combustion engine. Its parameters were as follows: two piston rings fitted one above another; diameter of a piston: 74 mm; piston stroke: 65 mm; one groove for such a triple piston ring; thickness of each piston ring: 2.5 mm; profile of a gap of each piston ring: a right-angled type; a symmetrical gap; two oil rings.

The internal combustion engine had two types of operation, namely a recoil hand starter (a rope start) and a electrically-actuated start. First of all, the internal combustion engine was started electrically, and a test driving was conducted. Subsequently, it was driven by a rope start. As a result, a compressing pressure was increased due to the betterment of the packing effect. Then, even a physically stout operator was not able to start the engine by a rope.

After that, a lubricating oil was purposely overcharged into a crank case, and an operation was conducted. Although some lubricating oil blew off from a pipe mounted between a carburetor and the crank case, for enhancing a sucking effect, it was confirmed that any lubricating oil did not blow off from the piston. That is, any white fume showing lubricating oil leak was not found in the exhaust gas.

The piston ring is a very important part for maintaining a good performance of the internal combustion gas, but many people think that today's piston rings have no problems. However, the following points should be considered carefully.

When the piston ring is worn out, the horse power of the gasoline engine is declined, thereby the lubricating oil is diluted by a mixed air leaked from the piston ring. Further, the cylinder is also worn out, thereby the exhaust gas is charged from the gap of the piston ring. Particularly, hydrocarbon and carbon are discharged frequently.

When the piston ring in a diesel engine is worn out, black fumes are discharged, so that it may cause a serious air pollution.

This invention can overcome such disadvantages.

Embodiment 2

A second embodiment of this invention will be described with reference to FIGS. 8 to 11 which are supported by claim 3. Claim 3 is a further modification of claim 2.

Figure 8:
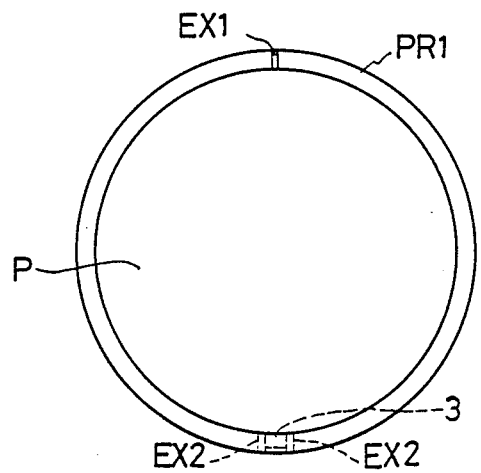
FIG. 8 is a plan view of a second embodiment according to this invention.
Figure 9:
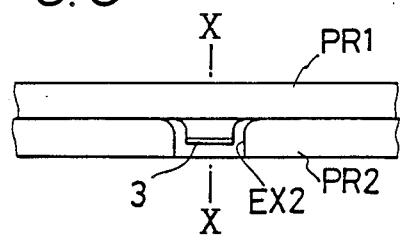
FIG. 9 is a front view of the second embodiment in FIG. 8.
Figure 10:
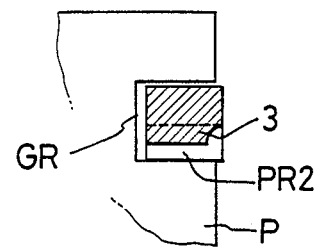
FIG. 10 is a partially cutaway section view in FIG. 8.

As shown in FIG. 8, in order that the gap $EX_1$ of the top piston ring $PR_1$ cannot face to the gap $EX_2$ of the second piston ring $PR_2$, the stop pin 3 is formed as a convex portion bulged on a surface of the second piston ring $PR_2$. In case of e.g. a dual piston ring, one of the two piston rings has to be provided with the stop pin 3, but the other piston ring requires no stop pin.

Figure 11:
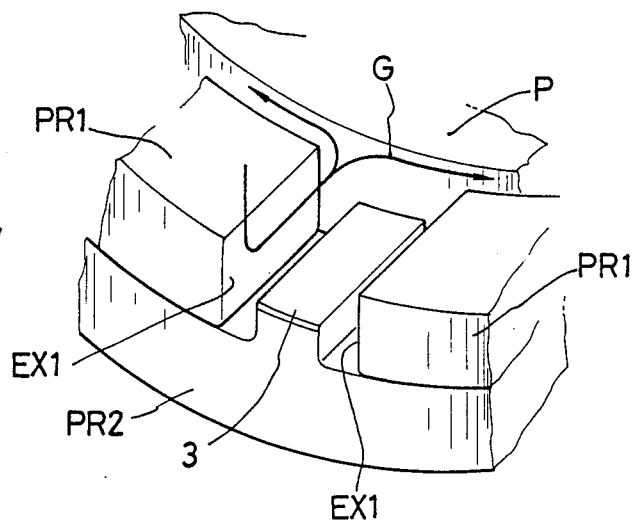
FIG. 11 is a partially cutaway perspective view of the gas flow in the second embodiment.

When mounting such a pair of piston rings in the groove GR of the piston, first of all the top piston ring having no stop pin is inserted therein. Following this step, the stop pin 3 of the second piston ring is inserted in the gap $EX_1$ of the top piston ring as shown in FIG. 11. Accordingly, the width of the gap $EX_1$ of the top piston ring has to be widened to some extent so as to receive the convex stop pin 3 of the second piston ring.

It is very easy to insert the piston having such a pair of piston rings into the cylinder. Further, since such a pair of piston rings are rotatable in the groove of the piston ring, wearing of the piston rings and of the cylinder is less. Preferably, the height of the bulged convex portion 3 is about 3 mm and of an angular type. Further, such bulged convex portion 3 is preferably integrally formed on the surface of the piston ring.

According to Embodiment 2 of this invention, only one of the two piston rings requires the stop pin, so that the production cost of the piston becomes inexpensive. In addition, mounting of such a pair of piston rings into the cylinder becomes very easy.

Embodiment 3

A third embodiment of this invention will be described with reference to FIGS. 12 to 14 which are supported by claims 4 and 5.

The piston rings according to this invention are used particularly to prevent the gas leakage entirely, and very effective for a large-scale diesel engine, in which the gap of the piston ring is relatively wider.

A remarkable aspect of this embodiment, a ring-shaped resilient member 4 is disposed immediately inside the second piston ring $PR_2$ in order to prevent a gas leakage from the gap EX2 of the second piston ring $PR_2$.

As shown in FIG. 12, the ring-shaped resilient member 4 is provided with a convex/concave profile in its direction. The ring-shaped resilient member 4 can prevent any gas leakage from the gap EX2 by means of a springy expansion of the resilient member 4. In a practical use, the top ring $PR_1$, the second ring $PR_2$ and the ring-shaped resilient member 4 are used as one pair. The number of the top ring $PR_1$ may be increased optionally.

Numeral 5 is a cylinder wall.

The ring-shaped resilient member 4 may be used as an auxiliary piston ring to prevent a gas leakage.

The multiple piston ring having such a ring-shaped resilient member is available for any type of piston machines such as e.g. a diesel engine having a high compression ratio.

Conventionally, when the outer diameter of a piston of e.g. a large-scale marine diesel engine is 840 mm, it has been found that the gap of the piston ring has been enlarged from 8 mm to 30 mm in the past four years. In this case, the aforesaid ring-shaped resilient member can exhibit a superior sealing effect to prevent any gas leakage.

What is claimed is:

1. A mounting structure of a multiple piston ring comprising:
   a piston;
   an annular groove formed on an outer surface of said piston;
   a top circular piston ring disposed within the groove and having an end gap;
   a second circular piston ring disposed within the groove with a top surface in abutment with a bottom surface of said top piston ring so that said rings are seated on each other, said second piston ring having an end gap spaced arcuately from the end gap in said top piston ring; and
   a ring-shaped resilient member disposed within the annular groove between said second piston ring and said annular groove in said piston, said resilient member having a convex/concave profiled surfaced with said convex surface disposed immediately inside the end gap of said second piston ring for substantially the entire height thereof to block flow of gas due to combustion in an internal combustion engine utilizing said piston and ring mounting structure and to maintain the spacing of said end gaps.

2. A mounting structure of a multiple piston ring as claimed in claim 1 wherein said convex surface includes a convex dimple extending outwardly from said surface into the end gap of said second piston ring.

* * * * *